Oct. 15, 1946.   H. S. AUSHERMAN   2,409,526
CHAIN TIGHTENING MEANS
Filed Feb. 19, 1945   2 Sheets-Sheet 2
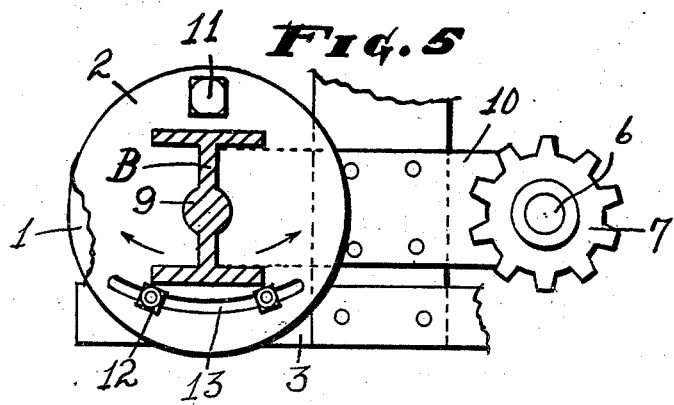
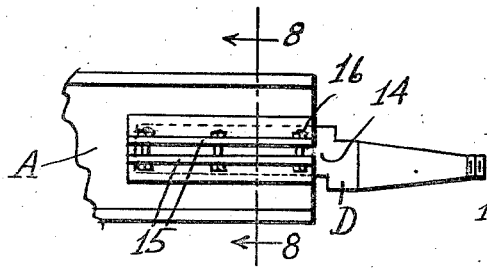
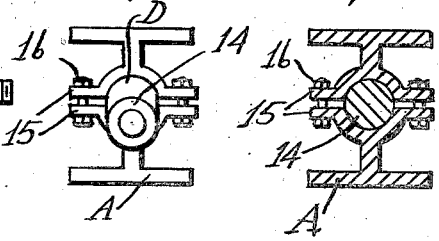
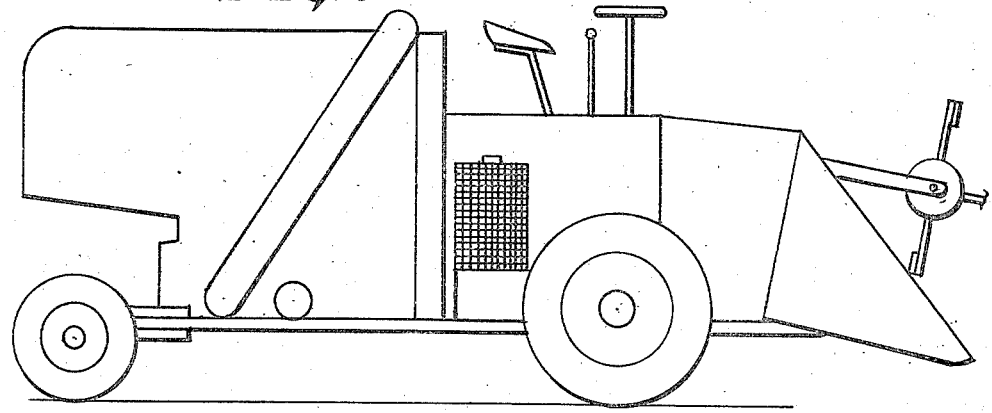
INVENTOR.
H. S. AUSHERMAN Patented Oct. 15, 1946

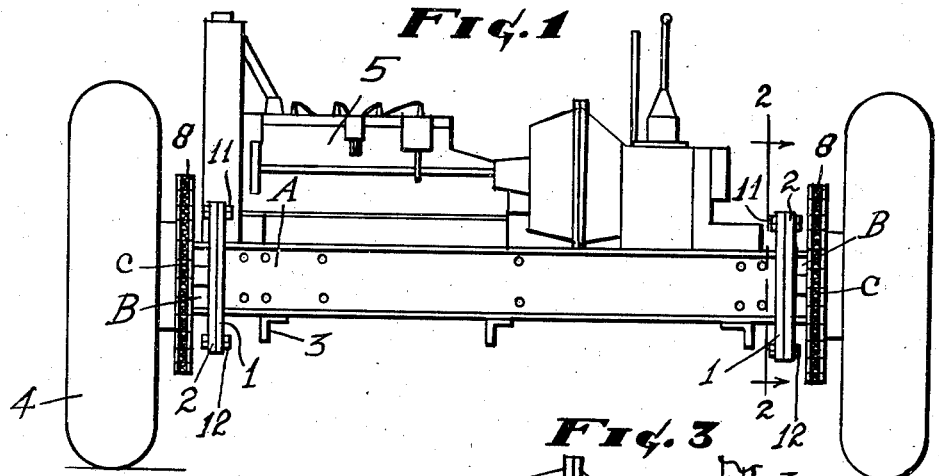
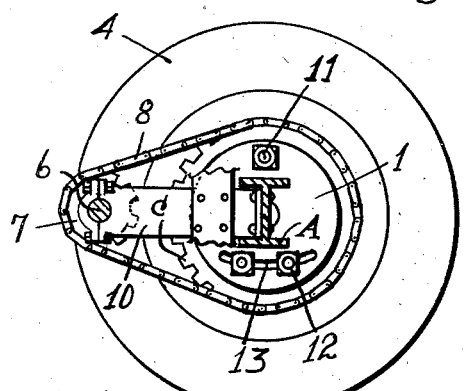
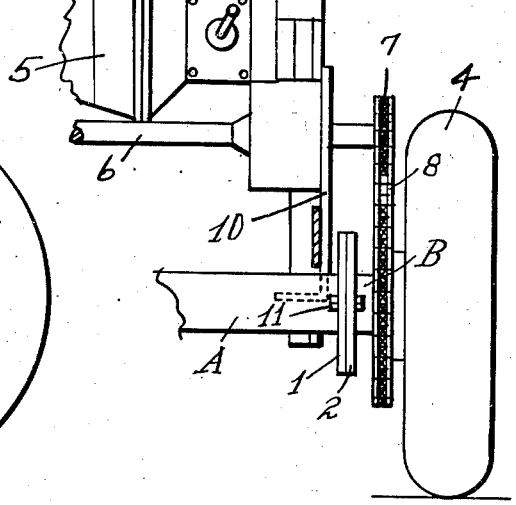
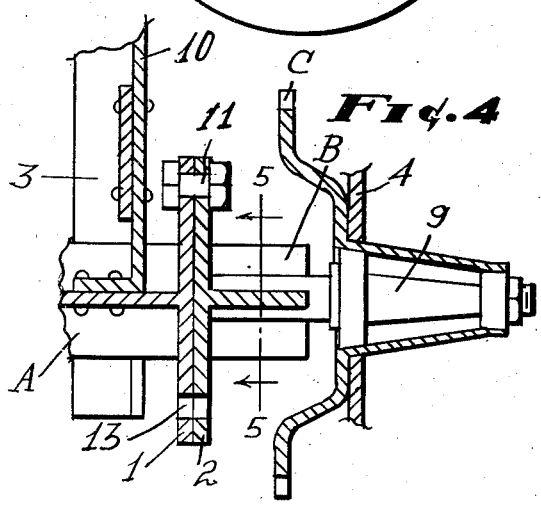

2,409,526

UNITED STATES PATENT OFFICE 2,409,526

CHAIN TIGHTENING MEANS

Harry S. Ausherman, Wichita, Kans.

Application February 19, 1945, Serial No. 578,597

2 Claims. (Cl. 74—242.16)

My invention relates to chain tightening means for master drive wheels of a self-propelled combine, and has for its principal object to provide means whereby the master wheel traction chains of a self-propelled combine may be properly tightened with less effort and time heretofore experienced, wherein it was necessary to add shims behind the bracket supporting a cross shaft that drives the said master wheels.

A further object of this invention is to provide an efficient take-up or tensioning means for sprocket wheel chains that are adaptable for coaction with former components of a combine for desired results; and furthermore said means being in the open is easily adjusted and firmly secured to a desired tension for said chains.

These and other objects will hereinafter be more fully explained, reference being had to the accompanying drawings forming a part of this specification and in which like characters will apply to like parts in the different views.

Referring to the drawings:

Fig. 1 is a front view of the master traction wheels and frame for carrying the combine and engine.

Fig. 2 is a sectional view taken on line 2—2 in Fig. 1.

Fig. 3 is a fragmentarily plan view of Fig. 1 to illustrate the working relation of the drive shaft to one of the master wheels.

Fig. 4 is an enlarged longitudinal sectional view through the main carrying beam and front axle, showing the arrangement and position of the invention.

Fig. 5 is a sectional view taken on line 5—5 in Fig. 4.

Fig. 6 is a modified method of tightening the traction chain.

Fig. 7 is an end view of Fig. 6.

Fig. 8 is a sectional view taken on line 8—8 in Fig. 6.

Fig. 9 is a side view of a self-propelled combine to which my invention may be applied.

My invention relates to tightening means for the master wheel traction chains of a self-propelled combine and consists of a pair of discs 1 and 2, the faces of which are positioned in contact for rockable movement of one of the discs later described.

It will be seen in the drawings that the standard frame 3, wheels 4 and motor 5 are employed and no change is made therein except in the main cross frame or axle that is I-shaped in cross section, and has been severed adjacent each end to provide portions A and B. Between the confronting corresponding ends where the frame has been severed, I have positioned a pair of said discs 1 and 2, discs 1 being integrally joined to the portions A while discs 2 are integrally joined to their respective B portions.

It will be understood that my invention is employed on combines which have one motor carried by the combine frame to actuate the separating means for grain and also convey the machine across the field without the use of a tractor.

In Fig. 3 is shown a drive shaft 6 that is driven by the engine. On each end of the drive shaft 6 is mounted a sprocket wheel 7 over which engages a chain 8, said chain also engaging over the teeth C formed on the master traction wheel 4 and the wheel being journalled on a standard spindle 9, the inner end of which is integrally formed into the portion B of the frame to support the combine. To move the machine the motor is started and shifted into a proper speed gear which will rotate the master traction wheels.

The chain 8 in its proper function must be occasionally tightened to prolong its use, or prior to the time that a link of the chain can be removed to take up a slack in the chains.

Heretofore the bracket 10 supporting the drive shaft 6 had to be removed to replace shims to tighten the chain, while in the present invention, each pair of discs 1 and 2 are placed with their confronting faces in contact and having a bolt 11 passing through said plates adjacent their upper extremity to rockably connect the same.

The discs that are secured to their respective spindle portions may be rocked in either direction across the other disc's vertical centers as an adjusting means to tension the chains engaging on their respective sprocket wheels.

When said chains are properly tensioned, the discs are secured against further movement by bolts 12 extending through slots 13 that are arcuate in form, the radii of which is centered on an axis at the head of the first said bolt to maintain registry of the slots as the discs are rocked, whereby last said bolts are free to be moved to desired points along the slots and then tightened to secure the discs rigid together when said chains are properly tightened.

It will also be seen that the said discs will function as coupling for the master wheels to their axle as well as to simplify tensioning the chain that turns the master traction wheel.

Figs. 6, 7, and 8 show a modification to tighten the chain in which case the standard axle is not severed as heretofore described but having its spindles removed and replaced by a modified spindle 14, said axle having a pair of clamping ears 15 on each side to secure the shaft rigidly therein when the bolts 16 are tightened. In this instance, the spindle having an offset D to move the axis of the portion of the spindle on which the wheel is journalled will rock toward and from the sprocket wheel 7, and such other modifications may be made as lie within the scope of the appended claims.

Having fully described my invention what I claim as new and desire to secure by Letters Patent is:

1. In driving chain tensioning means for the drive wheel of a combine, a toothed gear secured to one side of the drive wheel, a coupling for the drive wheel to the axle, said coupling being interposed in the axle by severing the same adjacent the drive wheel, whereby a stationary and a rockable portion is provided for the axle, said coupling comprising two members that are rockably connected eccentric to the wheel and longitudinal axis of the axle, one member of the coupling being secured to the stationary portion of the axle while the other member is secured to the rockable portion of the axle and on said rockable portion of the axle the wheel is journalled and adapted to rock to and fro horizontally across the longitudinal axis of the stationary portion of the axle to adjust tension of a drive chain connecting the drive wheel toothed gears to a power driven toothed gear to turn said drive wheel, and bolt means to secure the coupling members rigid together when the chain is properly tensioned.

2. In a tensioning means for a driving chain of a traction wheel, in combination with a combine having a drive shaft and a motor to turn the shaft, an axle and master wheels journalled on the axle, said drive shaft and master wheels having sprocket wheels and driving chains mounted on the sprocket wheels for traction of the combine, the axle being secured adjacent its ends whereby a stationary portion and rockable portions are provided by severing the shaft, a pair of circular discs for each end of the axle where the same has been severed, one disc of each pair being axially secured to its respective end of the stationary portion of the axle while the other discs are rigidly secured and being axial with their respective rocking portions of the axle, the said rockable portions having a spindle axially aligned and secured thereto on which their respective master wheels are journalled, said pairs of circular discs being rockably connected eccentrically, the rocking point on a radial line being vertically disposed whereby the traction wheels may be rocked to and fro across the center axis of the disc, and means to secure the discs as selectively rocked whereby the traction chains are adjustably tensioned.

HARRY S. AUSHERMAN.